US008327261B2

(12) United States Patent
Agrawal et al.

(10) Patent No.: US 8,327,261 B2
(45) Date of Patent: Dec. 4, 2012

(54) MULTILINGUAL TAGGING OF CONTENT WITH CONDITIONAL DISPLAY OF UNILINGUAL TAGS

(75) Inventors: Pramod Agrawal, Bangalore (IN);
Robert Chin, Burnaby (CA);
Rajasimhan Baskar, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 12/796,627

(22) Filed: Jun. 8, 2010

(65) Prior Publication Data

US 2011/0301938 A1 Dec. 8, 2011

(51) Int. Cl.
G06F 17/22 (2006.01)
G06F 17/23 (2006.01)
G06F 17/24 (2006.01)
G06F 3/00 (2006.01)

(52) U.S. Cl. .......................... 715/234; 715/265; 715/703
(58) Field of Classification Search .................. 715/234, 715/265, 703
See application file for complete search history.

(56) References Cited

U.S. PATENT DOCUMENTS

| | | | | |
|---|---|---|---|---|
| 6,275,789 | B1 * | 8/2001 | Moser et al. ........................ | 704/7 |
| 6,559,861 | B1 * | 5/2003 | Kennelly et al. ............... | 715/703 |
| 6,925,631 | B2 * | 8/2005 | Golden ........................... | 717/115 |
| 7,185,277 | B1 * | 2/2007 | Bernstein et al. .............. | 715/210 |
| 7,496,498 | B2 * | 2/2009 | Chu et al. ........................... | 704/4 |
| 7,548,914 | B2 | 6/2009 | Bell et al. | |
| 7,634,537 | B2 * | 12/2009 | Lu ................................. | 709/203 |
| 8,250,083 | B2 * | 8/2012 | Bennett ........................... | 707/756 |
| 2002/0007371 | A1 * | 1/2002 | Bray ........................... | 707/501.1 |
| 2002/0019839 | A1 * | 2/2002 | Shiu ................................ | 707/536 |
| 2002/0169802 | A1 * | 11/2002 | Brewer et al. .................. | 707/513 |
| 2003/0140316 | A1 * | 7/2003 | Lakritz ........................... | 715/536 |
| 2004/0044518 | A1 * | 3/2004 | Reed et al. ......................... | 704/8 |
| 2004/0168132 | A1 * | 8/2004 | Travieso et al. ............... | 715/536 |
| 2005/0076064 | A1 * | 4/2005 | Thomas et al. ................ | 707/200 |
| 2005/0272478 | A1 * | 12/2005 | Larson et al. ................. | 455/569.2 |
| 2008/0295070 | A1 * | 11/2008 | Bozza et al. ................... | 717/106 |
| 2009/0083620 | A1 * | 3/2009 | Fujimaki ........................ | 715/255 |
| 2009/0193096 | A1 * | 7/2009 | Boyer et al. ................... | 709/217 |
| 2009/0287471 | A1 * | 11/2009 | Bennett ............................. | 704/3 |
| 2011/0178791 | A1 * | 7/2011 | Stymne et al. ..................... | 704/2 |

(Continued)

OTHER PUBLICATIONS

Kelly et al., "Investigating Content Selection for Language Generation using Machine Language", ACM, 2009, pp. 130-137.*

(Continued)

*Primary Examiner* — Laurie Ries
*Assistant Examiner* — Soumya Dasgupta
(74) *Attorney, Agent, or Firm* — Silicon Valley Patent Group LLP; Omkar Suryadevara

(57) ABSTRACT

One or more computers are programmed to obtain an identifier of a natural language ("session language"). Additionally, the one or more computers are programmed to create and store in a computer memory, a webpage to be displayed to the user, including at least a title of a piece of content. In addition, the one or more computers automatically use the language identifier to select from among multiple tags that are expressed in multiple languages, a set of tags in the session language. One or more tags in the selected set are then stored in the web page in the computer memory, if the selected set is non-zero. If the number of tags in the selected set is zero (i.e. there exist no tags in the session language), in some embodiments a message is included in the webpage, indicating that there are no tags available.

20 Claims, 15 Drawing Sheets

U.S. PATENT DOCUMENTS

2011/0196854 A1* 8/2011 Sarkar .......................... 707/709
2011/0282941 A1* 11/2011 Chan et al. ................... 709/204

OTHER PUBLICATIONS

"Bilingual Tag Service, Anyone?", May 6, 2009, retrieved from http://leonardchien.wordpress.com/2009/05/06/bilingual-tag-service-anyone/, 4 pages.

Bausch, P. et al. "Flickr Hacks, Tips & Tools for Sharing Photos Online", Feb. 2006, 8 pages.

"Display Tags for Multiple Languages", retrieved on Nov. 12, 2009, http://www.rbsworldpay.com/support/kb/bg/customisingadvanced/custa7408.html, 1 page.

Whistler, K. et al. "RFC2482—Language Tagging in Unicode Plain Text", Jan. 1999, retrieved from http://www.faqs.org/rfcs/rfc2482.html, 11 pages.

"Popular Software Bookmarks" believed to be prior to Jun. 8, 2010, retrieved from http://delicious.com/popular/software, 1 page.

Hinkle, V. "Using Tag Clouds to Visualize Text Data Patterns", Apr. 2009, vol. 11, Issue 1, retrieved from http://www.surl.org/usabilitynews/111/tagcloud.asp, 8 pages.

"Timed Text Tags" believed to be prior to Jun. 8, 2010, retrieved from http://livedocs.adobe.com/flash/9.0/main/wwhelp/wwhimpl/common/html/wwhelp.htm?context=LiveDocs_Parts&file=00000611.html, 4 pages.

"Popular Visualization Tags", retrieved on Aug. 4, 2009, http://manyeyes.alphaworks.ibm.com/manyeyes/visualizations/tags, 1 page.

"Tag: text", believed to be prior to Jun. 8, 2010, retrieved from http://www.generatorx.no/tag/text/, 1 page.

Dotan, A. "A Cross-Cultural Analysis of Flickr Users from Peru, Israel, Iran, Taiwan and the United Kingdom", Jan. 2008, 157 pages.

* cited by examiner

FIG. 2B

| TAG | CONTENT ID | TAG LANGUAGE | USER ID | PUBLIC/PRIVATE | DATE & TIME |
|---:|---:|---:|---:|---:|---:|
| <u>251T</u> iraq | <u>251C</u> 101 | <u>251L</u> ENG | VP1 | Public | 9/8/2009 22:24 |
| irak | 101 | CFR | VP2 | Public | 1/1/2010 12:26 |
| drought | 101 | ENG | VP1 | Public | 9/8/2009 22:25 |
| sécheresse | 101 | CFR | VP2 | Public | 1/1/2010 12:27 |
| governance | 101 | ENG | VP1 | Public | 9/8/2009 22:26 |
| gouvernance | 101 | CFR | VP2 | Public | 1/1/2010 12:28 |
| conflict | 101 | ENG | VP1 | Public | 9/8/2009 22:27 |
| conflit | 101 | CFR | VP2 | Public | 1/1/2010 12:29 |
| great_lakes | 102 | ENG | VP1 | Public | 9/8/2009 22:28 |
| grands_lacs | 102 | CFR | VP2 | Public | 1/1/2010 12:30 |
| pollution | 102 | ENG | VP1 | Public | 9/8/2009 22:29 |
| dépollution | 102 | CFR | VP2 | Public | 1/1/2010 12:31 |
| restoration | 102 | ENG | VP1 | Public | 9/8/2009 22:30 |
| chine | 103 | CFR | VP2 | Public | 1/1/2010 12:32 |
| dam | 103 | ENG | VP1 | Public | 9/8/2009 22:31 |
| china | 103 | ENG | VP1 | Public | 9/8/2009 22:32 |
| barrage | 103 | CFR | VP2 | Public | 1/1/2010 12:33 |
| salween | 103 | ENG | VP1 | Public | 9/8/2009 22:33 |
| salouen | 103 | CFR | VP2 | Public | 1/1/2010 12:34 |
| burma | 103 | ENG | VP1 | Public | 9/8/2009 22:34 |
| birmanie | 103 | CFR | VP2 | Public | 1/1/2010 12:35 |

FIG. 4B

Main Menu
My Page  Guest  Investor  Administration
Personalize  Content Layout  Thu, Feb 25, 10 10:52 AM

Tag Cloud content administration blog Finance team Finance Workspace News publication buyer workspace HR taxonomy VP1's Blog discount california autoparts employee office hours mobile construction department demo press release event party celebrate

←—212

[Search] —418
218↑

Company News

Home | Resource Finder | Add to My Links | Sign out
[Search]  Portal
My Links  Select One:

Save the Date to Celebrate—211
Bring your family and come celebrate on Thursday, September 7 at Headquarters. We've got lots in store for you including food, drink, and special musical guests.
Tags: celebrate, event, party

Grand Opening in Milano—213
The grand opening will be held in a "magic," themed location (Umanitaria), where guests will be invited to experience the Middle Ages with a fairy-tale flavor.
Tags: event, press release

Headline News
- A Visitor's Guide to the San Francisco area—216
- PeopleSoft Ships Industry's First Pure Internet eBusiness Software
- Bring Your Parents to Work Day More....

Submit Article | Update Submitted Articles | 📶 Feed ▼
Information Technology News | Headline News | Human Resources News | Events

FIG. 4C

My Page   Guest   Investor   Administration
Main Menu
                                                                My Links  Select One:

Details

Section Articles                    Publication: Company News        Publication Sections
View Top Page | View Expired
                                    Save the Date to Celebrate —211   View All Articles and Sections  Feed ▶
Events
- Nominate your favorite PS employee  Source:    Corporate Communication   Events
- Sale on Financials                                                  Headline News
- Hot Talks: Free Tuition           Modified:   2004/12/12 11:24PM    Human Resources News
- Connect Conference                                                  Information Technology News
- Grand Opening in Milano           Edit Content
- SchoolHouse Rocks
- Save the Date to Celebrate        Bring your family and come celebrate on Thursday, September 7 at
                                    Headquarters. We've got lots in store for you including food, drink, and
                                    special musical guests.
                              420
                                    You won't want to miss the Company Celebration on the afternoon of
                                    Thursday, September 7 at Headquarters. We've got lots in store for
                                    you including food, drink, and special musical guests.

*Details on this landmark event coming soon...*

▶ Tags                                    Edit —412
                                    List : Public | Private
                              410   celebrate, event, party —411
                                    Tagged by 1 user

FIG. 4D

Main Menu ▼

| Section Articles | Details | Publication Sections |
|---|---|---|
| View Top Page | View Expired | Publication: Company News | View All Articles and Sections  Feed ▶ |

Events
- Nominate your favorite PS employee
- Sale on Financials
- Hot Talks: Free Tuition
- Connect Conference
- Grand Opening in Milano
- SchoolHouse Rocks
- Save the Date to Celebrate

Save the Date to Celebrate

Source: Corporate Communication

Modified: 2004/12/12 11:24PM

Edit Content

Bring your family and come celebrate on Thursday, September 7 at Headquarters. We've got lots in store for you including food, drink, and special musical guests.

You won't want to miss the Company Celebration on the afternoon of Thursday, September 7 at Headquarters. We've got lots in store for you including food, drink, and special musical guests.

*Details on this landmark event coming soon...*

▶ Tags
List: Public | Private
[celebrate, event, party]
[Update Tags] [Cancel]   — Edit —  ←431

Tagged by 1 user

430

Publication Sections

View All Articles and Sections  Feed ▶

Events
Headline News
Human Resources News
Information Technology News

FIG. 4E

Code d'utilisateur: [VP1]  — 51
Mot de passe: [***] — 52

Connexion

Sélectionnez une langue:

| English | Español |
| Dansk | Deutsch |
| Français | Français du Canada |
| Italiano | Magyar |
| Nederlands | Norsk |
| Polski | Português |
| Suomi | Svenska |
| Čeština | 日本語 |
| 한국어 | Русский |
| ไทย | 简体中文 |
| 繁體中文 | العربية |
| UK English | |

Définition d'indicateurs de traçage

FIG. 4F

Ma page | Invité | Investisseur | Administration | Mes liens | Choisissez-en un Personnaliser Teneur Disposition Février 25, 11h15

Tag Cloud

218T
[Recherche]

518

Société Nouvelles

Save the Date to Celebrate —211
Bring your family and come celebrate on Thursday, September 7 at Headquarters. We've got lots in store for you including food, drink, and special musical guests.

Grand Opening in Milano
The grand opening will be held in a "magic;" themed location (Uranitaria), where guests will be invited to experience the Middle Ages with a fairy tale flavor

Nouvelles Headline

- A Visitor's Guide to the San Francisco area
- PeopleSoft Ships Industry's First Pure Internet eBusiness Software
- Bring Your Parents to Work Day

!Plus ...

Soumettre un article  Mise à jour  Soumis article  Feed ▼

Nouvelles technologies de l'information  Nouvelles Headline  Ressources humaines Nouvelles  Événements

FIG. 4G

Section Articles

Voir le haut de la page

Événements
- Nominate your favorite PS employee
- Sale on Financials
- Hot Talks: Free Tuition
- Connect Conference
- Grand Opening in Milano
- SchoolHouse Rocks
- Save the Date to Celebrate

Details

Publication: Société Nouvelles

Save the Date to Celebrate

Source:     Corporate Communication

Modifié::    2004/12/12 11:24PM

Modifier le cont

Bring your family and come celebrate on Thursday, September 7 at Headquarters. We've got lots in store for you including food, drink, and special musical guests.

You won't want to miss the Company Celebration on the afternoon of Thursday, September 7 at Headquarters. We've got lots in store for you including food, drink, and special musical guests.

*Details on this landmark event coming soon...*

| Tags | |
|---|---|
| Liste: Public  Privé | Éditer —— 511 |
| Pas de tags disponibles | |
| Tags affichage en anglais —— 512 | |

Marqués par 0 utilisateurs

{ 510

Sections de Publication

Regarder tous les articles 🔊 Feed

Événements
Headline Nouvelles
Ressources humaines Nouvelles
Nouvelles technologies
       de l'information

FIG. 4H

Section Articles

Voir le haut de la page

Événements
- Nominate your favorite PS employee
- Sale on Financials
- Hot Talks: Free Tuition
- Connect Conference
- Grand Opening in Milano
- SchoolHouse Rocks
- Save the Date to Celebrate

Details

Publication: Société Nouvelles

Save the Date to Celebrate

Source:   Corporate Communication

Modifié:   2004/12/12 11:24PM

Modifier le cont

Bring your family and come! Celebrate on Thursday, September 7 at Headquarters. We've got lots in store for you including food, drink, and special musical guests.

You won't want to miss the Company Celebration on the afternoon of Thursday, September 7 at Headquarters. We've got lots in store for you including food, drink, and special musical guests

*Details on this landmark event coming soon...*

Tags
Liste: Public  Privé                Éditer
Pas de tags disponibles —— 511
Celebrate, event, party
                                    411
Marqués par 0 utilisateurs

510

Sections de Publication

Regarder tous les articles  Feed

Événements
Headline Nouvelles
Ressources humaines Nouvelles
Nouvelles technologies
             de l'information

FIG. 4I

Section Articles
Voir le haut de la page
Événements
- Nominate your favorite PS employee
- Sale on Financials
- Hot Talks: Free Tuition
- Connect Conference
- Grand Opening in Milano
- SchoolHouse Rocks
- Save the Date to Celebrate

Details
Publication: Société Nouvelles

Save the Date to Celebrate

Source:    Corporate Communication

Modifié:    2004/12/12 11:24PM

Modifier le cont
Bring your family and come celebrate on Thursday, September 7 at Headquarters. We've got lots in store for you including food, drink, and special musical guests.

You won't want to miss the Company Celebration on the afternoon of Thursday, September 7 at Headquarters. We've got lots in store for you including food, drink, and special musical guests

*Details on this landmark event coming soon....*

Tags — Éditer
Liste: Public  Privé
bonjour ————— 516

Marqués par 1 utilisateurs (510)

Sections de Publication
Regarder tous les articles 🔖 Feed
Événements
Headline Nouvelles
Ressources humaines Nouvelles
Nouvelles technologies
    de l'information

FIG. 4J

| Ma page | Invité | Investisseur | Administration | | Mes liens | Choisissez-en un |

Personnaliser Teneur Disposition Février 25, 11h15

Tag Cloud bonjour —516

[ Recherche ]

—518

Société Nouvelles

Save the Date to Celebrate —211
Bring your family and come celebrate on Thursday, September 7 at Headquarters. We've got lots in store for you including food, drink, and special musical guests.

Grand Opening in Milano
The grand opening will be held in a "magic," themed location (Umanitaria) where guests will be invited to experience the Middle Ages with a fairy-tale flavor.

Nouvelles Headline

- A Visitors Guide to the San Francisco area
- PeopleSoft Ships Industry's First Pure Internet eBusiness Software
- Bring Your Parents to Work Day

Plus ...

Soumettre un article  Mise à jour  Soumis article  Feed ►

Nouvelles technologies de l'information  Nouvelles Headline  Ressources humaines Nouvelles  Événements

MULTILINGUAL TAGGING OF CONTENT WITH CONDITIONAL DISPLAY OF UNILINGUAL TAGS

BACKGROUND

Computers that display websites via the world wide web on the Internet typically enable users to tag a piece of information ("content"), to enable that piece to be easily retrieved in future, using the tag. Users can describe or categorize a piece of content or a bookmark on a prior art website, using any terminology they determine to be most appropriate for the content piece being tagged.

Websites are now global in nature, generating and using web based content in multiple languages. However on many websites, tagging is supported in only a single language, such as in the English language on delicious.com, meaning that any piece of content can be tagged using English language tags. As several such English-only websites do not allow pieces of content to be tagged in a language other than English, this limitation hinders effective use by non-English users.

Furthermore, pieces of content in the form of transactional data of an enterprise cannot be tagged at an external website like delicious.com, because such transactional data is typically confidential to the enterprise and not accessible outside of an enterprise application.

As users can input any string of characters as a tag, it is possible for users to supply a string of non-English language text as the tag, e.g. if the tag can be expressed using the English Alphabet letters A-Z. For example, FIG. 1 illustrates a portion of a webpage 100 in which an article with title 101 entitled "Water is a Key Issue in Iraqi Election" has been tagged using tags in two languages, namely English language tags 111E-114E and French language tags 111F-114F. However, in prior art webpage 100 shown in FIG. 1, the English language tags 111E-114E and the French language tags 111F-114F are comingled and displayed together in a single line 110 immediately below title 101. Note that line 110 in webpage 100 includes the word "TAGS" and a colon ":" preceding the tags 111E-114E and 111F-114F thereby to visually separate title 101 from tags 111E-114E and 111F-114F.

Although bilingual tags 111E-114E and 111F-114F make title 101 equally accessible to users who speak the two languages French and English, this title 101 is not as easily accessible in other languages, such as Spanish, as there are no Spanish language tags in line 110. As users all over this world who may visit a website can speak in over 20 languages, the current inventors believe that inclusion of tags in each of the 20 languages makes it impractical to display tags in webpage 100 of the type shown in FIG. 1, i.e. in a single line 110. The current inventors further note that displaying multi-lingual tags (in over 20 languages) could result in multiple lines of tags (e.g. 10 lines). The current inventors further note that display of numerous lines of multi-lingual tags makes tagging impractical, as each user needs to visually search for tags that the user recognizes in their own language, because (as per webpage 100 in FIG. 1) tags in different languages are comingled, in all prior art known to the inventors.

SUMMARY

One or more computers are programmed in accordance with the invention to obtain an identifier of a natural language ("session language"), such as English, French, German, Cantonese, Mandarin, Hindi and Japanese. Additionally, the one or more computers are programmed to create and store in a computer memory, a webpage to be displayed to the user, including at least a title of a piece of content. In addition, the one or more computers automatically use the language identifier to select from among multiple tags that are expressed in multiple languages, a set of tags in the session language. One or more tags in the selected set are then stored in the web page in the computer memory, if the selected set is non-zero (i.e. if there is at least one tag expressed in the session language). If the number of tags in the selected set is zero (i.e. there exist no tags in the session language), in some embodiments a message is included in the webpage, indicating that there are no tags available.

Depending on the embodiment, an identifier of a predetermined language (different from the session language) is additionally used by the one or more computers as follows. Specifically, if there exist no tags in the session language, the predetermined language identifier is used to automatically select an alternative set of tags that are expressed in the predetermined language. Thereafter, depending on the embodiment, either a hyperlink to the alternative set of tags or at least one tag in the alternative set of tags is included in the webpage. If the alternative set of tags is zero, then in some embodiments, only the message indicating that there are no tags is included in the webpage (i.e. no tags or hyperlink are included).

BRIEF DESCRIPTION OF THE FIGURES

FIG. 2B illustrates an embodiment of the computer memory of FIG. 2A, wherein tag metadata is stored in a table.

FIGS. 4A-4J illustrate webpages that are generated by the computer of FIG. 2A, in some embodiments of the invention.

DETAILED DESCRIPTION

Figure 1:
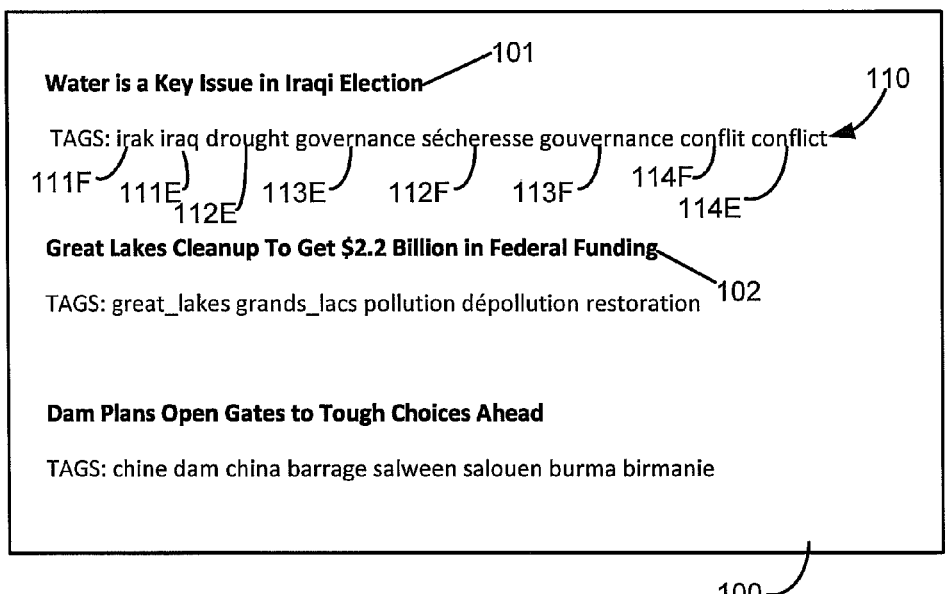
FIG. 1 illustrates, a web page of the prior art, including a title 101 associated with tags 101E-104E in the English language and tags 101F-104F in the French language.
Figure 2A:
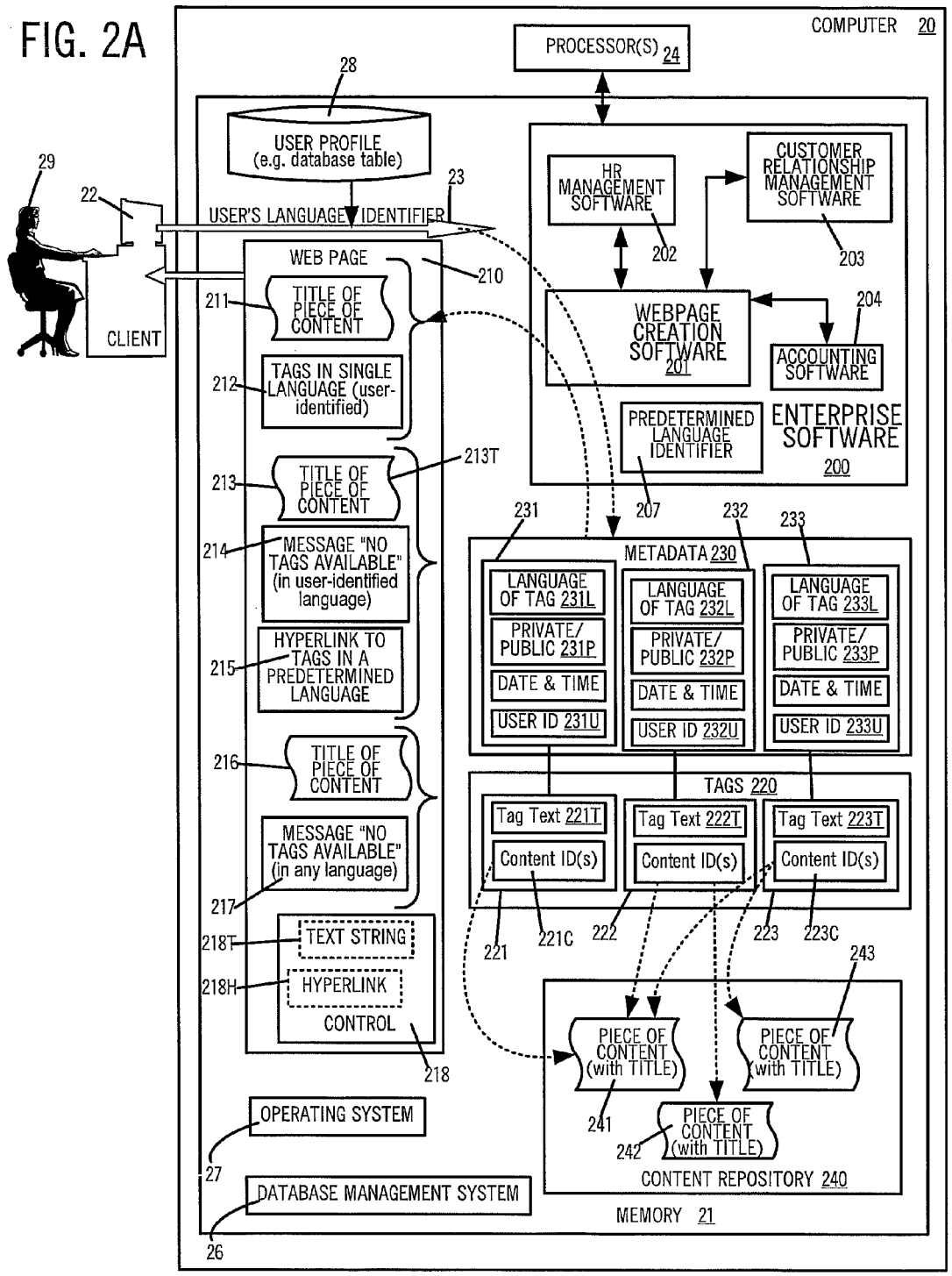
FIG. 2A illustrates, in a block diagram, a computer in accordance with the invention including in computer memory, tag metadata for each tag identifying at least a language of the tag.

Referring to FIG. 2A, a computer 20 ("server") is specifically programmed, in some embodiments of the invention, to implement a particular machine which executes enterprise software 200 stored in memory 21 to display tags in a user-identified language. Specifically, one or more computers are programmed in accordance with the invention, to obtain an identifier 23 of a language. In the embodiment illustrated in FIG. 2A, a language for a session with the user ("session language" or "login language") is determined during login time. Specifically, in the illustrated embodiment, if the user logs in a French session, then identifier 23, which is a session variable, is set to French. In the example shown in FIG. 2A, the identifier 23 is not based on the user's identity. However as will be apparent to the skilled artisan, in an alternative example which is not shown in any figure, the user's identity is used to perform a table look up in a database that contains user profiles, to obtain the language identified in identifier 23.

In some illustrative embodiments, computer 20 receives an indication of the session language from the user, e.g. by displaying via computer 22 ("client"), a number of hyperlinks labeled with a corresponding number of names of natural languages, such as English, Dansk, Français, Italiano, Nederlands, Poloski, Suomi, Español etc. (see names 43 in FIG. 4A). In the example illustrated in FIG. 4A, a user may select, e.g. by clicking a button of a mouse 25 (FIG. 2A), any one of twenty-three natural languages identified by names 43 included in a login webpage 41 that also includes a login id 31 and a password 32.

Computer 20 (FIG. 2A) also creates and stores in computer memory 21, a webpage 210 (FIG. 2A) to be displayed to user 29. Webpage 210 (FIG. 2A) is prepared by a processor 24 in computer 20 executing software 201 ("webpage creation software") in an application program 200 ("enterprise software") to include one or more titles 211, 213, and 216 of corresponding pieces 241, 242 and 243 of content. Content is any information to be displayed to a user, such as text and/or graphics, or audio or video or a still image, depending on the embodiment. Enterprise software 200 may include any software normally executed in a computer used by an enterprise during normal operation, such as accounting software 204, human resource (HR) management software 202, and customer relationship management (CRM) software 203.

Computer 20 automatically uses language identifier 23 with metadata 230 ("tag metadata") to select from among multiple tags 220 (FIG. 2A) expressed in several languages (such as one of twenty-three languages that are supported), a set of tags in the session language. Each of tags 220 typically includes a string of text ("tag text") and associated therewith an identifier of a piece of content. For example, tag 221 (FIG. 2A) includes tag text 221T and content identifier 221C that identifies content piece 241, while tags 222 and 223 respectively include tag texts 222T and 223T and respective content identifiers 222C and 223C.

As illustrated in FIG. 2A, each of tags 221-223 is associated in memory 21 with corresponding tag metadata 231-233 that includes a corresponding language identifier 231L-233L ("tag language identifier"). Processor 24 checks if the session language identifier 23 matches any of tag language identifiers 231L-233L and if so the corresponding one or more of tags 221-223 is automatically included (by processor 24) in the selected set. For example, if tag language identifiers 231L and 232L identify the language "French" while tag language identifier 233L identifies the language "English" and if the session language is "French" then the two tags 221 and 222 are included in the selected set.

Processor 24 then stores in the above-described web page 210, one or more tags 212 (FIG. 2A) in the selected set, if the selected set is non-zero (i.e. there is at least one tag in the session language). If the number of tags in the selected set is zero (i.e. there exist no tags in the session language), then in some embodiments of computer 20, a message 214 (FIG. 2A) is included in webpage 210, indicating that there are no tags available.

Depending on the embodiment, an identifier 207 of a predetermined language (different from the session language) is additionally used by processor 24 with tag metadata 230 as follows. Specifically, the predetermined language identifier 207 (e.g. English) is used to automatically select an alternative set of tags (e.g. tag 223) expressed in the predetermined language (also called "base language"). Thereafter, depending on the embodiment, either a hyperlink 215 (FIG. 2A) to the alternative set of tags or at least a tag 212 in the alternative set of tags is included in webpage 210. If the alternative set of tags is zero, then in some embodiments, message 217 indicating that there are no tags is included in webpage 210 (without any tags in any language).

Figure 4A:
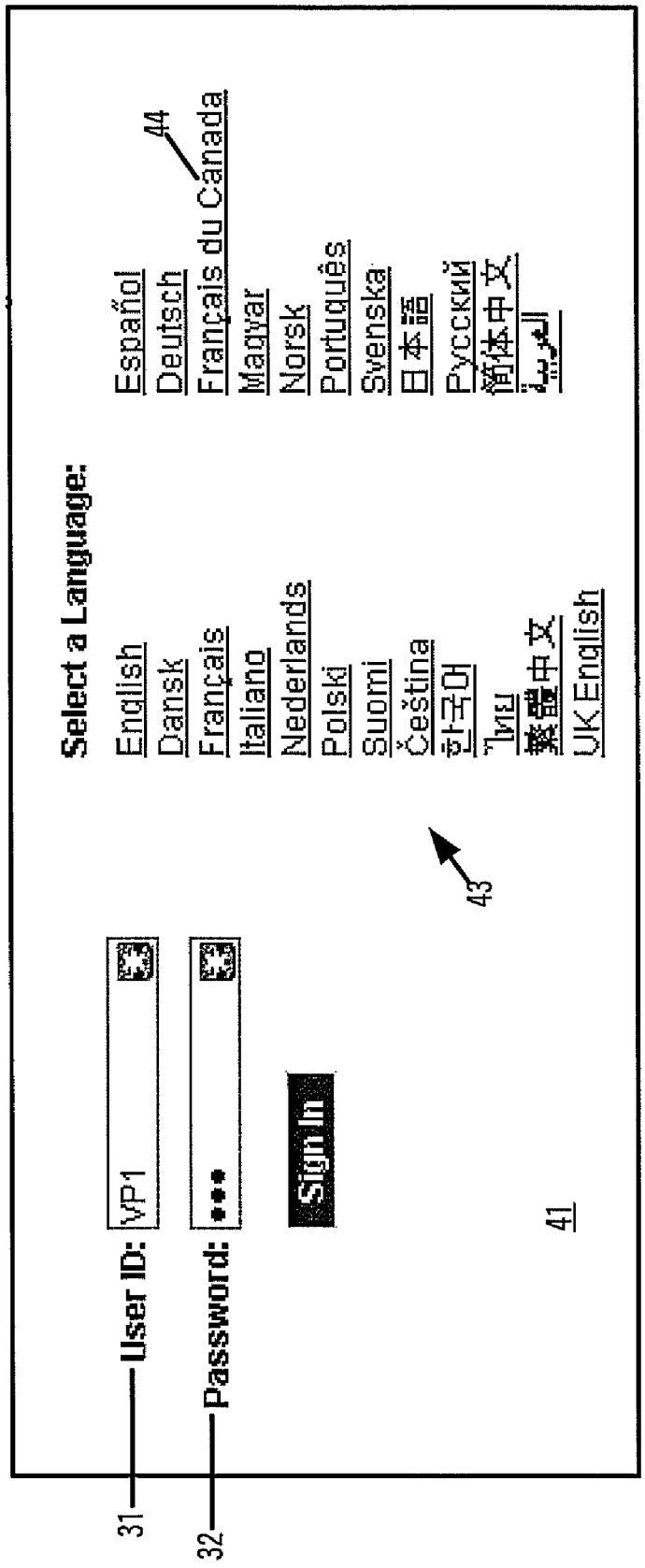

In addition to tag language identifiers 231L-233L (FIG. 2A), tag metadata 231-233 described above may include additional attributes depending on the embodiment, as follows. Public/private attributes 231P-233P identify whether the corresponding tag 231-233 is publicly visible to other users or if the tag 231-233 is private to the user 29 who logged in via login webpage 41 (FIG. 4A). User Id attributes 231U-233U identify the author of the corresponding tag 231-233. Date/time attributes (not labeled in FIG. 2A, to improve clarity), identify the date and time of the last modification of the corresponding tag 231-233. Note that the just-described additional attributes are optional, i.e. one or more of them are not used in certain embodiments.

In some embodiments, tag metadata 230 and tags 220 are stored in a table 250 (FIG. 2B) in a database in a nonvolatile storage device that is accessed by processor 24 executing instructions of a database management system 26, such as the Oracle Database. Table 250 has one column 250T to hold tag text 221T (e.g. string 251T of value "iraq"), another column to hold content identifier 221C (e.g. content ID 251C of value "101"), and yet another column 250L to hold tag language identifier 231L (e.g. language ID 251U of value "ENG"). In the example illustrated in FIG. 2B, computer 20 can use the value "ENG" as the tag language identifier in column 250L to retrieve tags in only the English language although table 250 holds tags in both English and in Canadian French. Similarly, use of the value "CFR" as the tag language identifier retrieves tags in the Canadian French language.

Figure 3:
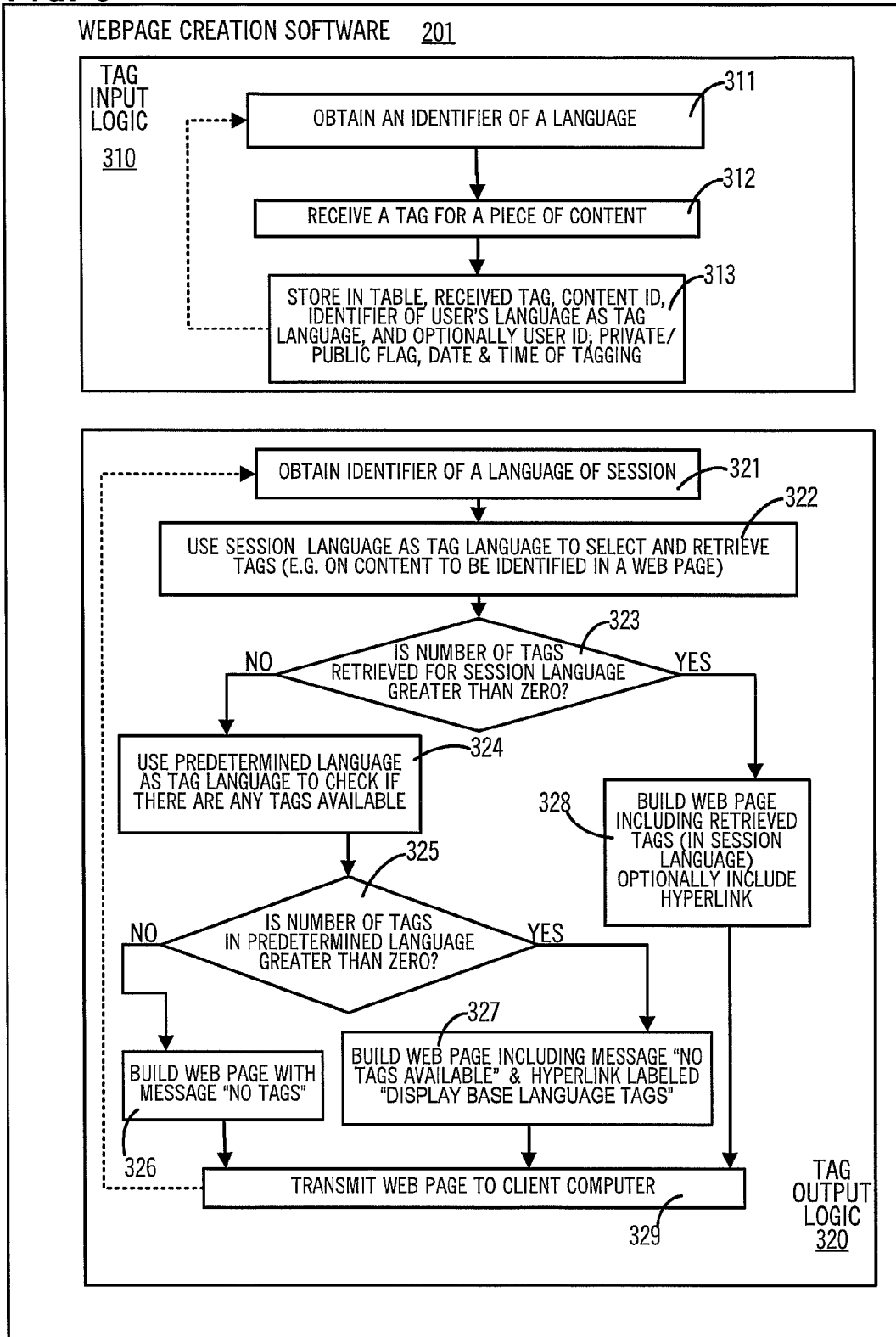
FIG. 3 illustrates, in a flow chart, a method performed by a tag processor that is included in the computer of FIG. 2A, in some embodiments of the invention.

Accordingly, table 250 is populated in some embodiments by use of a tag input logic 310 that is included in webpage creation software 201 as illustrated in FIG. 3. Specifically, in act 311 computer 20 obtains an identifier of a language of a user e.g. in the manner described above in reference to FIGS. 2A and 4A. Next in act 312 computer 20 receives a tag for a piece of content. Thereafter, in act 313, computer 20 stores in a single row 251 of table 250 the received tag, the identifier of the content piece as well as the session language (as the tag's language). Depending on the embodiment, computer 20 may also store in the same row 251 the additional attributes, such as user's identifier, a flag indicating whether the tag is private or public, and a date/time of tagging.

Moreover, table 250 is used in some embodiments by a tag output logic 320 that is also included in webpage creation software 201 as illustrated in FIG. 3. Specifically, in act 321, computer 20 obtains an identifier of a language of a session e.g. in the manner described above in reference to FIGS. 2A and 4A. Next, in act 322, computer 20 uses the session language as the tag language to select and retrieve tags from table 250. Then in act 323, computer 20 checks if the number of retrieved tags is greater than zero, and if so computer 20 builds the webpage 210 by including therein one or more of the retrieved tags, and then goes to act 329. In act 329, the webpage 210 is transferred to client computer 22, and then computer 20 returns to act 321 described above.

Depending on the embodiment, an identifier of a title 211 in webpage 210 (FIG. 2A) may be additionally used in selecting the set of tags, and if so then the set of tags are included in web page 210 in association with (e.g. displayed adjacent to) title 211, e.g. immediately below the title 211. Alternatively, the set of tags may be included in a tag cloud 418 (FIG. 4A) that is not associated with any specific title. Note that tag cloud 418 is one embodiment of a control 218 that includes a text string 218T associated with a hyperlink 218H (FIG. 2A).

In act 323, if the number of tags is not greater than zero, then computer 20 goes to act 324. In act 324, a predetermined language, such as English, is used to retrieve tags from table 250. Note that depending on the embodiment, the predetermined language may or may not be included in user profile 28 (and hence different for different users, or same across all users). Thereafter in act 325, computer 20 checks if the number of tags in the predetermined language is greater than zero. If so, then computer 20 goes to act 327 to build a webpage including a message "No tags available" and further including a hyperlink to tags in the predetermined (i.e. base) language, and then goes to act 329 (described above). If the predetermined (i.e. base) language is English, the hyperlink (included in act 327) is labeled "Display English language tags" (in the session language). Note that the just-described hyperlink label is itself expressed in the session language, e.g. if the session language is French, then this hyperlink (included in act 327) is labeled "tags affichage en langue anglaise". When the user clicks on the just-described hyperlink, tags in the predetermined language are displayed. In act 325 if the answer is no, then computer 20 goes to act 326 to build a webpage with the message "No tags" and then goes to act 329.

FIGS. 4A-4J illustrate screens that are displayed to a user based on webpages built by computer 20 of some embodiments. FIG. 4B illustrates a webpage after the user has logged in by using the webpage illustrated in FIG. 4A. FIG. 4C illustrates the webpage after When the user clicks on a title 211 (see FIG. 4B), a new webpage (FIG. 4C) is displayed to the user, with more information in the content piece identified by the title 211. Note that this webpage (FIG. 4C) shows a control 410 ("tag control") that includes tags 411 which are selected by computer 20 by use of an identifier of the content 420 identified by title 211. On clicking an edit button 412 in control 410 shown in FIG. 4C, computer 20 makes the tags editable by the user, as shown in control 430 in the webpage of FIG. 4D (as the user is allowed to enter tag text separated by commas, into box 431).

In the webpage shown in FIG. 4A, the user may select Canadian French 44 as their language in which case the webpage in FIG. 4E is displayed to the user. Note that the session language has been used by computer 20 to automatically select text strings for login id 51 and password 52 included in the webpage in FIG. 4E.

On logging in using the webpage in FIG. 4E, a webpage in the French language (e.g. see FIG. 4F) is displayed to the user. At this stage, in this example, tag cloud 518 is empty (in this example, table 250 currently has no tags in French). Note that although the webpage of FIG. 4F is in French (e.g. various text labels in controls, such as Ma page, Invité, Investisseur, etc are all in French), the titles of articles are in an original language, namely English language (because they are originally English-language articles). When the user selects a title 211 in FIG. 4F, the webpage in FIG. 4G is displayed, with the "No tags available" message 511. Note that in FIG. 4G, immediately below this message 511, another message 512 is included "Tags affichage en anglais" with a hyperlink (shown by underlining) that when clicked results in a display of English language tags.

Specifically, when the user clicks on message 512 in FIG. 4G, message 512 is replaced with tags 411 in the English language as shown in the webpage of FIG. 4H. When the user adds a new tag "bonjour" in the webpage of FIG. 4G (e.g. by clicking on the control labeled "Éditer" which means Edit in French), the newly-added tag 516 is associated with the session language and then the webpage of FIG. 4I is constructed based on the session language. As there is one tag in the session language, this single tag is shown in the webpage of FIG. 4G without any messages. Thereafter, the user may return back to the previous page (e.g. by hitting the "back" button in a web browser), and on doing so tag cloud 518 is updated to shown the French tag 516, as illustrated by the webpage in FIG. 4J.

Note that in FIG. 2A, content identifier 222C identifies content piece 242. Depending on how tagging has been done, it should be readily apparent to the skilled artisan that a single tag (e.g. tag 223) in computer 20 can be associated with multiple content pieces (e.g. pieces 231 and 233). Depending on the implementation, table 250 may have either a single row or multiple rows, for each combination of content piece and tag.

Although in the embodiment illustrated in FIG. 2A, content pieces 231, 232 and 233 are stored in a content repository 230 within computer 20, numerous alternative embodiments will be readily apparent to the skilled artisan in view of this disclosure. For example, in certain alternative embodiments, content pieces 231-233 are stored in other computers that are accessible to client computer 22 either directly or indirectly via server computer 20.

Depending on the embodiment, any one or more of titles 211, 213 and 216 that are included in web page 210 may or may not be expressed in the session language, as identified by identifier 23. Also depending on the embodiment, webpage 210 can be created either before or after computer 20 obtains language identifier 23. In certain embodiments, webpage 210 is created after obtaining language identifier 23, and computer 20 is programmed to include in web page 210 at least a string of text in the session language as identified by identifier 23. Note that inclusion of a text string in webpage 210 is optional, and not performed in certain embodiments (e.g. wherein webpage 210 is created before obtaining language identifier 23).

In certain embodiments in accordance with the invention, a string expressed in the session language in webpage 210 occurs in a control 218 therein. An example of control 218 includes a navigation hyperlink 218H and the string "Search" expressed in English as text string 218T when the session language is English as shown in FIG. 4B. Alternatively, control 218 includes the string "Recherche" (expressed in French) as text string 218T, when the session language is French as shown in FIG. 4F. Hence, in such embodiments, the language of tags 212 in webpage 210 is same as the language of text string 218T in a control 218, and both are selected by computer 20 using identifier 23 of the session language. However, title(s) of articles are expressed in an original language which is independent of (i.e. unrelated to) the session language, as shown in FIGS. 4B and 4F wherein the same title 211 is shown in English. So when a user logs in with French as their session language, controls as well as tags are shown to the user in the French language, but article titles are shown in their original language which happens to be English.

As will be readily apparent to the skilled artisan in view of this disclosure, in another alternative embodiment of computer 20, a title 213 may itself constitute the above-described string in the session language, e.g. see string 213T in webpage 210 (FIG. 2A). In the just-described alternative embodiment, language identifier 23 is used by computer 20 to automatically obtain title 213 from a database that contains table 250 and/or from content repository 230. However, in another such alternative embodiment, language identifier 23 is used in automatically performing machine translation of title 213 from another language, to obtain string 213T.

The method of FIG. 3 may be used to program a computer system 1000 of the type illustrated in FIG. 5A which is discussed next. Specifically, computer system 1000 includes a bus 1102 (FIG. 5A) or other communication mechanism for communicating information, and a processor 1105 coupled with bus 1102 for processing information. Computer system 1000 uses as its memory 21 (FIG. 2A) a main memory 1106, such as a random access memory (RAM) or other dynamic storage device, coupled to bus 1102 for storing information and instructions (e.g. for the method of FIG. 3) to be executed by processor 1105. Therefore, main memory 1106 implements memory 21 (FIG. 2A) in some embodiments of the invention.

Main memory 1106 also may be used for storing temporary variables or other intermediate information (e.g. table 250 shown in FIG. 2B) during execution of instructions to be executed by processor 1105. Computer system 1000 further includes a read only memory (ROM) 1104 or other static storage device coupled to bus 1102 for storing static information and instructions for processor 1105, such as enterprise software 200. A storage device 1110, such as a magnetic disk or optical disk, is provided and coupled to bus 1102 for storing information and instructions.

Computer system 1000 may be coupled via bus 1102 to a display device or video monitor 1112 such as a cathode ray tube (CRT) or a liquid crystal display (LCD), for displaying information to a computer user. For example, the screens in FIGS. 4A-4J may be displayed on display 1112, or on a similar display of another computer. An input device 1114, including alphanumeric and other keys (e.g. of a keyboard), is coupled to bus 1102 for communicating information and changes to, e.g. tag text 221T and content ID 221C (FIG. 2A) to processor 1105 (FIG. 5A). Another type of user input device is cursor control 1116, such as a mouse, a trackball, or cursor direction keys for communicating information and command selections to processor 1105 and for controlling cursor movement on display 1112 (FIG. 5A). This input device typically has two degrees of freedom in two axes, a first axis (e.g., x) and a second axis (e.g., y), that allows the device to specify positions in a plane.

As described elsewhere herein, tag input logic 310 (FIG. 3) and tag output logic 320 in enterprise software 200 is implemented by computer system 1000 (FIG. 5A) in response to processor 1105 executing one or more sequences of one or more instructions that are stored in main memory 1106. Such instructions (i.e. software) may be read into main memory 1106 from another computer-readable storage medium, such as storage device 1110. Execution of the sequences of instructions contained in main memory 1106 causes processor 1105 (or a similar processor inside server 1100) to perform the operations of a process described herein and illustrated in FIG. 3. In alternative embodiments, hard-wired circuitry may be used in place of or in combination with one or more sequences of instructions, to implement the invention. Thus, embodiments of the invention may implement different specific combinations of hardware circuitry and software, depending on requirements.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM (such as ROM 1104) any other memory chip or cartridge that can be used as storage device 1110. Volatile storage media includes dynamic memory, such as main memory 1106 which may be implemented in the form of a random access memory or RAM. Accordingly, several embodiments of the invention include one or more non-transitory tangible media (but not transitory propagating signals) comprising software in the form of instructions to processor 1105 (FIG. 5A) to perform a method of the type illustrated in FIG. 3.

Instructions to processor 1105 (or a similar processor inside server 1100) can be provided by a transmission link or by a storage medium from which a computer can read information, such as data and/or code. Specifically, various forms of transmission link and/or storage medium may be involved in providing one or more sequences of one or more instructions for execution to processor 1105 (or to a similar processor inside server 1100). For example, the instructions may initially be comprised in a storage device, such as a magnetic disk, of a remote computer. The remote computer can load the instructions into its dynamic memory (RAM) and send the instructions over a telephone line using a modem.

A modem local to computer system 1000 can receive information about a change to a tag on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 1000 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 1000, are exemplary forms of carrier waves transporting the information.

Computer system 1000 can send messages and receive data, including program code, through the network(s), network link 1120 and communication interface 1115. In the Internet example, a server 1100 might transmit information related to e.g. tag text 221T and content ID 221C retrieved from a distributed database system through Internet 1124, ISP 1126, local network 1122 and communication interface 1115. The instructions for performing the method of FIG. 3 may be executed by processor 1105 as they are received, and/or stored in storage device 1110, or other non-volatile storage media for later execution. In this manner, computer system 1000 may obtain the just-described instructions and any related data in the form of a carrier wave.

Figure 5A:
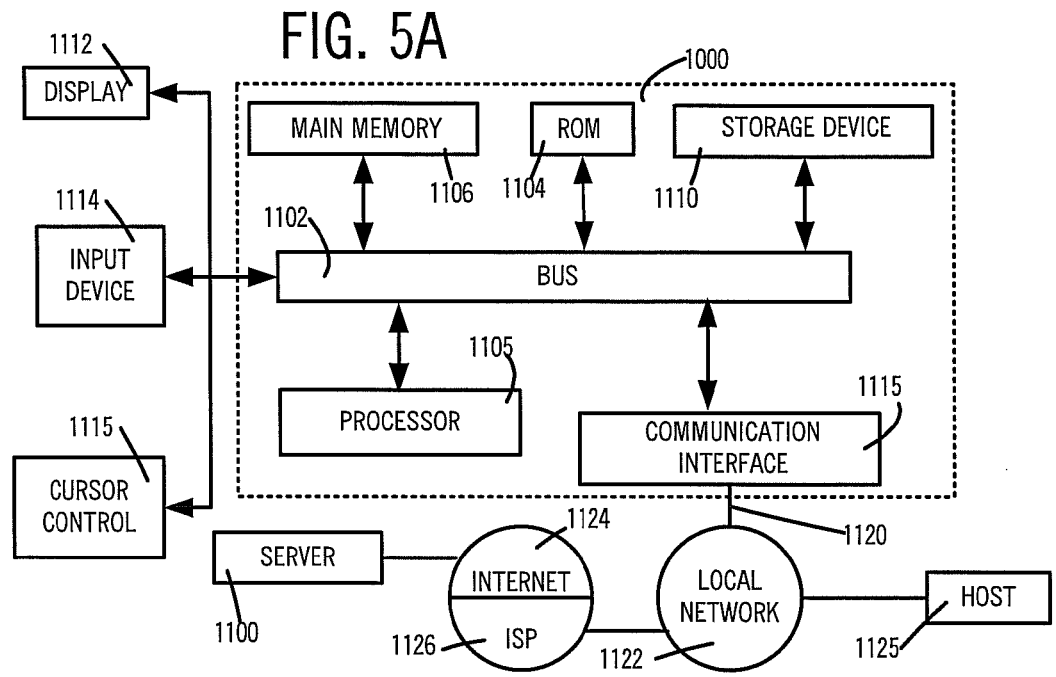
FIGS. 5A and 5B illustrate, in block diagrams, hardware and software portions of a computer that performs the method illustrated in FIG. 3.
Figure 5B:
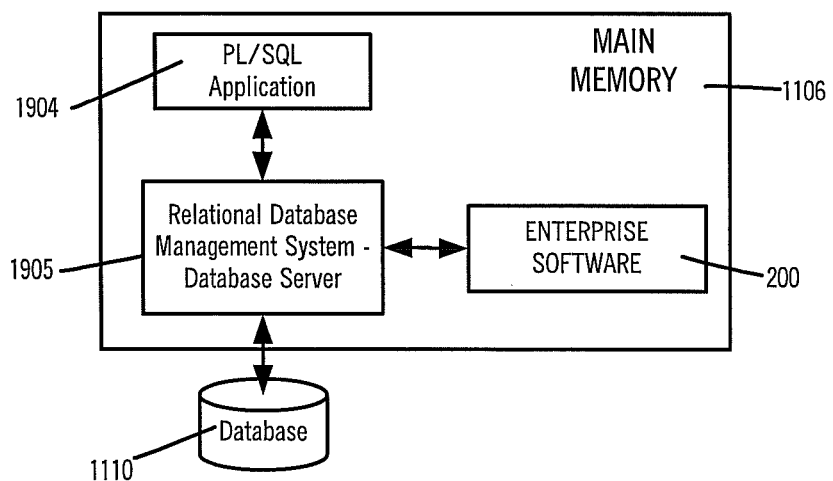

Note that FIG. 5A is a very low-level representation of many hardware components of a computer system. Several embodiments have one or more additional software components in main memory 1106 as shown in FIG. 5B. Specifically, in such embodiments, computer system 1000 of FIG. 5A implements a relational database management system 1905 of the type illustrated in FIG. 5B. Relational database management system 1905 may manage a distributed database system that includes multiple databases, each database being stored on different storage mechanisms.

In some embodiments, multiple databases are made to appear to an application 1904 as a single database. In such embodiments, an application 1904 can access and modify the data in a database via a network that interconnects them. In other embodiments, an application 1904 interacts with only one database, e.g. database 1110. Database 1110 is controlled by a database management server (DBMS) 1905 which maintains overall consistency of data stored by database 1110. In several embodiments, the DBMS is responsive to commands (also called queries) from application 1904 (e.g. which may include enterprise software 200) in conformance with a relational database language, the most common of which is the Structured Query Language (SQL). The commands are used by application 1904 of some embodiments to store, modify and retrieve data about tags in the form of rows in table 250 (FIG. 2B) in database 1110 (FIG. 5B). The tables have one or more columns and zero or more rows as in a relational database that stores data in the form of tables related to one another.

Relational database management system 1905 further includes an output logic that makes e.g. tag text 221T and content ID 221C available to a user via a graphical user interface that generates a display on video monitor 1112. In one example, the output logic provides results via a web-based user interface that depicts information related to a tag and marks any changes to the tag. Additionally and/or alternatively, a database-centric screen is responsive to a command in a command-line interface and displays on a video monitor text information on incoming and/or outgoing flows of information about a tag.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. One or more non-transitory computer-readable storage media comprising a plurality of instructions to cause a computer to:
   obtain a first identifier of a first natural language;
   create and store in a memory of said computer, a webpage comprising at least a title of a piece of content;
   use the first identifier of the first natural language to select a first set of tags associated with said piece of content, from among a plurality of tags comprising strings of text expressed in a plurality of natural languages;
   wherein each tag in the first set comprises a string of text expressed in the first natural language and an identifier of said piece of content;
   if a number of tags in the first set is non-zero, store at least a first string of text comprised in one tag in the first set of tags in said webpage in said memory; and
   if the number of tags in the first set is zero, use a second identifier to select a second set of tags comprising strings of texts expressed in a second natural language different from the first natural language, and store in the webpage in said memory, at least one of:
   (A) a hyperlink to the second set tags; or
   (B) at least a second string of text comprised in one tag in the second set of tags.

2. The one or more computer-readable storage media of claim 1 wherein the plurality of instructions further cause said computer to:
   use said identifier of said piece of content in addition to said first identifier, to select the first set of tags.

3. The one or more computer-readable storage media of claim 1 wherein the plurality of instructions further cause said computer to:
   display a link indicating availability of tags in the second natural language;
   wherein the second set of tags are displayed only in response to user clicking on said link.

4. The one or more computer-readable storage media of claim 1 wherein the plurality of instructions further cause said computer to:
   display a message indicating no tags available in the first natural language.

5. The one or more computer-readable storage media of claim 1 wherein:
   the computer displays no tags adjacent to the description, other than tags in only one of the first set and the second set.

6. The one or more computer-readable storage media of claim 1 wherein:
   the second identifier has a predetermined value for all users of the computer.

7. The one or more computer-readable storage media of claim 1 wherein:
   prior to receipt of the first identifier, the plurality of instructions cause the computer to store in the memory, the first set of tags associated with the first identifier of the first natural language.

8. The one or more computer-readable storage media of claim 1 further comprising instructions to cause said computer to:
   display the first set of tags adjacent to the description in the first natural language, if the number of tags is greater than zero.

9. A computer-implemented method for tagging content, the method comprising:
   receiving a first identifier of a first natural language, of a session of a computer with a user;
   automatically displaying in the first natural language, at least a description of a piece of content accessible to the computer;
   at least one processor using the first identifier to retrieve from a memory, a first set of tags comprising strings of text expressed in the first natural language;
   wherein each tag in the first set comprises a string of text expressed in the first natural language and an identifier of said piece of content; and
   automatically checking if a number of the tags in the first set is greater than zero and if not then automatically using a second identifier to retrieve and display adjacent to the description in the first natural language, a second set tags comprising strings of text expressed in a second natural language different from the first natural language.

10. The computer-implemented method of claim 9 further comprising:
automatically using an identifier of said piece of content in addition to said first identifier, to select the first set of tags.

11. The computer-implemented method of claim 9 further comprising:
automatically displaying a link indicating availability of tags in the second natural language;
wherein the second set of tags are displayed only in response to user clicking on said link.

12. The computer-implemented method of claim 9 further comprising:
automatically displaying a message indicating no tags available in the first natural language.

13. The computer-implemented method of claim 9 wherein:
no tags are displayed adjacent to the description, other than tags in only one of the first set and the second set.

14. The computer-implemented method of claim 9 wherein:
the second identifier has a predetermined value for all users of the computer.

15. The computer-implemented method of claim 9 further comprising:
prior to receipt of the first identifier, automatically storing in the memory, the first set of tags associated with the first identifier of the first natural language.

16. The computer-implemented method of claim 9 further comprising:
automatically displaying the first set of tags adjacent to the description in the first language, if the number of tags is greater than zero.

17. An apparatus for interfacing with a user, the apparatus comprising a processor and a memory coupled to the processor, the apparatus comprising:
means for receiving a first identifier of a first natural language, of a session of said computer with a user;
means for displaying in the first natural language, at least a description of a piece of content accessible to the computer;
means for using the first identifier to retrieve from said memory, a first set of tags expressed in the first natural language;
wherein each tag in the first set comprises a string of text expressed in the first natural language and an identifier of said piece of content; and
means for checking if a number of the tags in the first set is greater than zero and if not then using a second identifier to retrieve and display adjacent to the description in the first natural language, a second set tags expressed in a second natural language different from the first natural language.

18. The apparatus of claim 17 further comprising:
means for using an identifier of said piece of content in addition to said first identifier, to select the first set of tags.

19. The apparatus of claim 17 further comprising:
means for displaying a link indicating availability of tags in the second natural language;
wherein the second set of tags are displayed only in response to user clicking on said link.

20. The apparatus of claim 17 further comprising:
means for displaying a message indicating no tags available in the first natural language.

* * * * *